3,639,643
METHOD FOR ELIMINATION OF THE 32° C.
PHASE TRANSITION IN GRANULES AND PRILLS
CONTAINING FREE AMMONIUM NITRATE AND
PRODUCTS PRODUCED THEREBY
Bengt O. P. Mollerstedt and Eduard Sulcs, Ljungaverk,
 Sweden, assignors to Fosfalbolaget, Sweden
No Drawing. Filed Feb. 25, 1969, Ser. No. 802,210
Claims priority, application Sweden, Feb. 26, 1968,
 2,455/68
Int. Cl. C01c 1/18; C05c 1/02; C06b 1/04
U.S. Cl. 252—1                                       14 Claims

ABSTRACT OF THE DISCLOSURE

This invention relates to a method for elimination of the 32° C. phase transition in granules containing free ammonium nitrates by incorporating into the liquid nitrate solution, prior to conversion of the nitrate into solid form, a colloidal hydrate or hydroxide of silicon or iron or aluminum.

BACKGROUND

Granular products containing ammonium nitrate are widely used in fertilizers and blasting composition. They are manufactured by prilling and by various granulation methods. In order to avoid caking during storage it is known that the granules can be coated with finely dispersed inorganic substances such as kieselguhr.

In the production, transport, and storage of ammonium nitrate containing products the granules will be exposed to various strains such as attrition, mechanical shocks, and vibrations which often cause a considerable amount of disintegration into powder. Since any protective surface on the granules is destroyed by disintegration, the practical consequence is that partial or complete caking into hard lumps can occur.

Improved strength is therefore desirable so that the nitrate prills or granules can maintain their identity even if exposed to rapid mechanical strains.

It is also well known to manufacture granules containing ammonium nitrate admixed with various inorganic fillers (such as finely ground limestone or dolomite meal) in order to eliminate the characteristic of the nitrate of being a blasting raw material and thus also to eliminate the risks when it is used as a fertilizer. However, admixing these fillers with the granules has no beneficial influence on the mechanical strength of the granules themselves.

THE PRESENT INVENTION

We have now discovered it is possible to produce ammonium nitrate containing prills or granules that have substantially improved mechanical strength. Such an effect can be achieved in accordance with the present invention when the prills or granules are prepared in such a manner that they contain a colloidal inorganic filler prepared in situ, that is, when said inorganic filler is prepared in the solution or melt from which the granules are to be formed.

The colloidal substance can be silicon hydrate, iron hydroxide or aluminum hydroxide or mixtures of the same which is insoluble in the ammonium nitrate containing melt or solution and which has been precipitated therein according to known methods for the manufacture of colloids.

The invention is based on the surprising discovery that the colloidal hydrates or hydroxides of silica, iron or aluminum effect the phase transitions in the nitrate containing crystals. Thus, for instance, the so called 32°-transition causes granules of ammonium nitrate, prepared by means of heretofore known methods, to disintegrate to a powdery flour after a few temperature cycles around said temperature.

However, the granules provided with an "internal" filler consisting of said hydrates or hydroxides according to this invention can without changes, be subjected to such a treatment. This is of great practical importance particularly when the ammonium nitrate is manufactured in a country having a tropical climate, or is sold to a purchaser in a country having a tropical climate.

A prior art solution for eliminating said phase transition and thus eliminating its effect on the strength of the granules is to transform the ammonium nitrate completely into double salts such as ammonium sulfate nitrate. This presupposes however that the other component is included in a stoichiometrical quantity and therefore is an essential part of the final product.

The colloidal fillers introduced into ammonium nitrate in accordance with this invention have a considerable effect, even when used in small amounts. This is particularly advantageous when the ammonium nitrate or the ammonium nitrate containing product is to be used in blasting compositions, since a high content of inert additives would have a desensitizing influence and could render the product unsuitable for its actual purpose. The content of filler can be within the range of 0.1–2%, and preferably 0.2–1%. Apart from ammonium nitrate other known blasting components can be included.

Also, in the manufacture of fertilizers containing free ammonium nitrate the same effect is attained with the mentioned filler content. A higher content of colloidal filler gives no further improvement in the granule strength worth mentioning, but higher contents can nevertheless be advantageous because it has a desensitizing affect on the nitrate, which is desired in fertilizers. The fillers according to this invention can also be used in combination with heretofore known and conventional fillers.

EXAMPLE 1

(Relating to porous prills of ammonium nitrate)

(1.1) A 96% aqueous solution of ammonium nitrate was prilled and the screen analysis resulted in prills of the following size.

| Millimeters: | Percent |
|---|---|
| >2 | 0 |
| 1.5–2 | 2 |
| 1.0–1.5 | 69 |
| 0.5–1.0 | 27 |
| <0.5 | 2 |

The prills had a porosity, expressed as oil absorption, amounting to 10–14%. They were subjected to several temperature cycles between 20 and 40° C. and then the dimension stability was determined by a shaking test:

50 g. of prills and 50 g. stainless steel pellets having a diameter of ¼" were put into a 100 ml. polyethylene bottle and placed in a shaking apparatus. After 30 minutes of shaking the test material was screened through a DIN 12 screen. The crushed prills which passed through the screen were weighed and determined as a percentage of the whole quantity tested.

When employing the above mentioned prills, that is those without a filler, the test specimens were crushed after only 5 temperature cycles so that 100% passed through the screen.

(1.2) Tests were then carried out in which the nitrate solution prior to prilling was *admixed* with between about 0.5% and 0.8% of aluminum hydroxide of commercial quality, resulted in prills which after only 5 temperature cycles were crushed so that 98% passed through the screen.

(1.3) Ammonium nitrate containing an "internal" filler in accordance with our invention was produced according to the same prilling process as in Example 1.1 and 1.2 but colloidal aluminum hydroxide was *precipitated* in situ in the nitrate solution. This was carried out by dissolving an aluminum sulfate in the 96% nitrate solution which thereby became somewhat turbid from the partial hydrolysis of the aluminum salt, which also caused a decrease in pH to within the range of 1–2. Immediately before the solution was pumped to the nozzle for prilling it was neutralized with ammonia and under sufficient agitation that a homogenous dispersion of colloidal aluminum hydroxide was formed.

The prills obtained had the same screening analysis and about the same porosity as in Example 1.1. However, the shaking test after repeated temperature cycles showed considerably improved figures, as indicated below:

| Test | Additive | Shaking test (percent thru screen) | | | | Remarks |
|---|---|---|---|---|---|---|
| | | 5 cycles | 10 cycles | 12 cycles | 20 cycles | |
| 1.3.1 | 0.5% $Al_2(SO_4)_3$ | 52 | 54 | 52 | 50 | |
| 1.3.2 | 1.0% $Al_2(SO_4)_3$ | 88 | | | | Without neutralization. |
| 1.3.3 | 1.0% $Al_2(SO_4)_3$ | 14 | 36 | 32 | 38 | Not completely neutralized. |
| 1.3.4 | 1.0% $Al_2(SO_4)_3$ | 8 | 12 | 12 | 14 | Completely neutralized. |
| 1.3.5 | 2.0% $Al_2(SO_4)_3$ | 12 | 16 | 14 | 14 | |
| 1.3.6 | 0.5% $KAl(SO_4)_2$ | 76 | 94 | | | |
| 1.3.7 | 1.0% $KAl(SO_4)_2$ | 40 | 64 | 66 | 72 | |
| 1.3.8 | 1.0% $Al(NO_3)_3$ | 32 | 38 | 42 | 44 | |

The results from tests 1.3.2 to 1.3.4, which with the same addition of aluminum sulfate are carried out with various completeness of precipitation of the colloidal aluminum hydroxide, show that the desired affect is achieved by said colloidal aluminum hydroxide. It could be established by differential thermoanalysis that this affect is achieved by a retardation or elimination of the crystal transition of modification III to modification IV (and vice versa).

EXAMPLE 2

(Relating to granules of ammonium and sodium nitrate)

1,000 kgs. of 45% sodium hydroxide solution was admixed with 60 litres of a water glass solution (38° Bé.) and then with vigorous agitation 2,000 kgs. 57% nitric acid were added. The neutralization was carried out with gaseous ammonia and the solution was evaporated to a water content of less than 5%. The nitrate melt was granulated to granules having a diameter of about 1.1% calculated as $SiO_2.H_2O$. Even after having been subjected to repeated temperature cycles the granulated product could be spread by means of an ejector device without crushing, even though it was subjected to rough treatment.

EXAMPLE 3

(Relating to large diameter granules of ammonium nitrate)

A 94% aqueous solution of ammonium nitrate was admixed with aluminum sulfate and then with ammonia so that it contained 0.5% colloidal $Al(OH)_3$ based on the quantity of nitrate. Granulation was performed in a screw type granulator with addition of recycled material, whereby granules having essentially a diameter of 4–8 mm. were obtained. After drying, oversize and undersize granules were screened off, crushed and recycled to the granulation step.

Compared with conventional fertilizer grade ammonium nitrate these coarser prills are particularly advantageous when fertilizing forests. At the same fertilizing intensity (kg./hectar) the coarser prills are distributed more sparsely and thus the undesired fertilizing of the ground vegetation is reduced while a greater part of the nitrogen penetrates down to the roots of the trees. When spraying the fertilizer by airplane, the coarser prills have additional advantage because due to their heavier impact they do not get caught in the tree tops and thus they do not cause so called burns on the foliage and needles of the trees.

A prerequisite for achieving the mentioned advantages however is that the prills be resistant to the hard impact against the top of the trees and the ground. This means that the prills must not have been weakened by phase transitions. Forest fertilizers usually are distributed in winter and are stored in the forest for spreading during the season for this activity, usually the beginning of summer. Temperature shifts have caused the large nitrate granules produced according to heretofore known methods to lose their strength and to sometimes even deteriorate into flour. The present invention has resulted in a method for the production of granules which have greater resistance to shock and temperature change, which results in excellent granules for forest fertilization.

EXAMPLE 4

(Relating to lime ammonium nitrate)

Lime ammonium nitrate containing 26% N is produced by granulating or prilling of a hot concentrated ammonium nitrate solution containing finely ground limestone flour (meal), and the product obtained is cooled before storage.

If 1–10% of the quantity of limestone meal is replaced by a colloidal filler the storage properties are improved, which is of particular importance when storing in bulk or high bag piles. When the colloidal filler is one of the aforementioned oxide hydrates an added economy can be achieved in that the granules do not have to be cooled as much before they leave the production process and can therefore leave with a higher temperature. Using these fillers thus results in an important economic advantage in that (a) the cooling drums in existing plants can be operated at higher temperatures, which mean higher capacities and (b) when building new plants smaller and therefore less costly cooling drums can be installed.

We claim:

1. A method for elimination of the 32° C. phase transition in granules and prills containing free ammonium nitrate, which comprises precipitating between about 0.1 and 10% of at least one colloidal material selected from the group consisting of silicon hydrates, iron hydroxides, aluminum hydroxides, and mixtures thereof, into a fluid medium containing ammonium nitrate, while the nitrate is still in a fluid condition, said ammonium nitrate being present in said fluid medium in an amount sufficient to provide, upon solidifying free ammonium nitrate which is not in the form of a double salt, and then converting the nitrate in fluid form into a solidified nitrate containing said hydroxides or oxide hydrates substantially uniformly distributed throughout the matrix of the solidified nitrate, which contains said free ammonium nitrate.

2. A method according to claim 1 wherein the colloidal material is present in an amount between about .01 and 2.0%.

3. A method according to claim 2 wherein said material is silicon hydrate.

4. A method according to claim 2 wherein said material is iron hydroxide.

5. A method according to claim 2 wherein said material is aluminum hydroxide.

6. A method according to claim 1 wherein said colloidal material is present in an amount between 0.2 and 1.0%.

7. A method according to claim 6 wherein said material is silicon hydrate.

8. A method according to claim 6 wherein said material is iron hydroxide.

9. A method according to claim 6 wherein said material is aluminum hydroxide.

10. A granular product containing free ammonium nitrate and between 0.1 and 10% of a colloidal material dispersed in a substantially uniform manner throughout the internal matrix thereof, said colloidal material being selected from the group consisting of hydroxies or oxide hydrates of silicon, iron and aluminum, and mixtures thereof.

11. The product of claim 10 wherein said material is silicon hydrate.

12. The product of claim 10 wherein said material is iron hydroxide.

13. The product of claim 10 wherein said material is aluminum hydroxide.

14. The product of claim 10 wherein said colloidal material is present in an amount between 0.2 and 1.0%.

References Cited
UNITED STATES PATENTS

| | | | |
|---|---|---|---|
| 3,282,674 | 11/1966 | Mohr et al. | 71—59 X |
| 3,388,014 | 6/1968 | Russo | 149—46 X |
| 3,428,418 | 2/1969 | McFarlin et al. | 23—103 |

JOHN T. GOOLKASIAN, Primary Examiner

J. C. GIL, Assistant Examiner

U.S. Cl. X.R.

23—103; 71—59, 60; 149—46